United States Patent
Kim et al.

(10) Patent No.: US 8,155,688 B2
(45) Date of Patent: Apr. 10, 2012

(54) METHOD AND APPARATUS FOR ADJUSTING POWER CONTROL MODE IN WIRELESS COMMUNICATION SYSTEM

(75) Inventors: Dong Cheol Kim, Anyang-si (KR);
Minseok Noh, Anyang-si (KR);
Hyunwoo Lee, Anyang-si (KR);
Seunghee Han, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 264 days.

(21) Appl. No.: 12/615,060

(22) Filed: Nov. 9, 2009

(65) Prior Publication Data

US 2010/0119000 A1 May 13, 2010

Related U.S. Application Data

(60) Provisional application No. 61/112,782, filed on Nov. 10, 2008.

(51) Int. Cl.
*H04Q 7/20* (2006.01)

(52) U.S. Cl. .......... 455/522; 455/69; 455/500; 455/517; 455/127.1; 455/509; 370/328; 370/329; 370/343; 370/310; 370/338

(58) Field of Classification Search .................. 455/522, 455/69, 500, 517, 127.1, 67.11, 426.1, 426.2, 455/507, 508, 509, 514, 515; 370/328, 329, 370/343, 310, 338, 313
See application file for complete search history.

(56) References Cited

U.S. PATENT DOCUMENTS

| | | | | |
|---|---|---|---|---|
| 6,085,108 A | * | 7/2000 | Knutsson et al. | 455/522 |
| 7,826,417 B2 | * | 11/2010 | Yang et al. | 370/329 |
| 2009/0262670 A1 | * | 10/2009 | Cho et al. | 370/280 |

* cited by examiner

*Primary Examiner* — Keith Ferguson
(74) *Attorney, Agent, or Firm* — Birch, Stewart, Kolasch & Birch, LLP

(57) ABSTRACT

A method and an apparatus for adjusting power control mode in a wireless communication system is provided. A mode change message is transmitted from a base station (BS) to a user equipment (UE) to request changing a power control mode from a base station (BS). The mode change message comprises a power control mode change (PMC) field which indicates the power control mode to be changed. The UE transmits a UE confirmation message to the BS, and receives a BS confirmation message from the BS. The UE changes the power control mode based on the mode change message.

5 Claims, 6 Drawing Sheets

METHOD AND APPARATUS FOR ADJUSTING POWER CONTROL MODE IN WIRELESS COMMUNICATION SYSTEM

CROSS-REFERENCE TO RELATED APPLICATIONS

This application claims the benefit of priority of U.S. Provisional application No. 61/112,782 filed on Nov. 10, 2008 which is incorporated by reference in its entirety herein.

BACKGROUND OF THE INVENTION

1. Field of the Invention

The present invention relates to wireless communication and, more particularly, to a method and apparatus for adjusting a power control mode in a wireless communication system.

2. Related Art

The next-generation multimedia wireless communication systems that are being actively researched in recent years are required to process various pieces of information, such as video and wireless data, at a higher data transmission rate as well as the initial voice-centered services.

In the case of broadband wireless communication systems, effective transmission and reception schemes and their application methods have been proposed in order to maximize the efficiency of limited radio resources. One of systems that are being taken into consideration, from among the next-generation wireless communication systems, is an Orthogonal Frequency Division Multiplexing (OFDM) system capable of attenuating an Inter-Symbol Interference (ISI) effect with a low complexity. In the OFDM system, data symbols received in series are converted into an N number of parallel data symbols and then transmitted with them carried on an N number of respective separated subcarriers. The subcarriers maintain orthogonality in the frequency dimension. Each of orthogonal channels experiences independent frequency selective fading. Accordingly, the degree of complexity at a reception stage is reduced and the gap between the transmitted symbols is lengthened, thereby being capable of minimizing ISI.

Orthogonal Frequency Division Multiple Access (OFDMA) refers to a multiple access method of realizing multi-access by independently providing users with some of available subcarriers in a system using OFDM as a modulation method. In general, in the OFDMA method, frequency resources called subcarriers are provided to each user, and frequency resources are independently provided to a number of respective users such that they do not overlap with each other. Consequently, the frequency resources are exclusively assigned to the respective users. In an OFDMA system, frequency diversity for multiple users can be obtained through frequency selective scheduling, and subcarriers can be assigned to the users in various ways according to a permutation method for the subcarriers. Further, the efficiency of a space domain can be increased through a space multiplexing scheme using multiple antennas.

A wireless communication system uses a power control scheme as one of methods for reducing a path loss according to the distance between a base station and a terminal and Inter-Cell Interference (ICI) resulting from neighbor cells. The power control scheme is a scheme for adjusting transmission power such that data can be transmitted at the lowest power level while maintaining the Quality of Service (QoS) of a wireless communication system. In particular, in multi-cell environments, terminals near a cell boundary are greatly influenced by a path loss, ICI, etc. The terminals must determine proper transmission power and transmit data such that the QoS is not deteriorated according to a path loss while not interfering with neighbor cells.

Accordingly, there is a need for an effective power control scheme for an efficient system.

SUMMARY OF THE INVENTION

The present invention provides a method and apparatus for adjusting a power control mode in a wireless communication system.

In an aspect, a method of adjusting power control mode in a wireless communication system is provided. The method includes receiving a mode change message to request changing a power control mode from a base station (BS), the mode change message comprising a power control mode change (PMC) field which indicates the power control mode to be changed, wherein the PMC field indicates one of closed-loop (CL) mode, open-loop (OL) passive retention mode, OL passive reset mode, and OL active mode, transmitting a user equipment (UE) confirmation message to the BS, the UE confirmation message confirming the receipt of the mode change message, and receiving a BS confirmation message from the BS, the BS confirmation message confirming the receipt of the UE confirmation message. The method may further include changing the power control mode based on the mode change message. The mode change message may comprise a confirmation field which indicates request of the power control mode. The BS confirmation message may comprise a confirmation field which indicates confirmation of the receipt of the UE confirmation message. A size of the confirmation field may be 1 bit.

In another aspect, a method of adjusting power control mode in a wireless communication system is provided. The method includes transmitting a mode change request message to request changing a power control mode to a BS, the mode change request message comprising a PMC field which indicates the power control mode to be changed, wherein the PMC field indicates one of CL mode, OL passive retention mode, OL passive reset mode, and OL active mode, receiving a BS confirmation message from the BS, the BS confirmation message confirming the receipt of the mode change request message, and transmitting a UE confirmation message to the BS, the UE confirmation message confirming the receipt of the BS confirmation message. The method may further include changing the power control mode based on the mode change request message. The BS confirmation message may comprise a confirmation field which indicates confirmation of the receipt of the UE confirmation message or retainment of the present power control mode. A size of the confirmation field may be 1 or 2 bit.

In another aspect, a UE in a wireless communication system is provided. The UE includes a RF unit for transmitting or receiving a radio signal, and a processor operatively coupled to the RF unit and configured to receive a mode change message to request changing a power control mode from a BS, the mode change message comprising a PMC field which indicates the power control mode to be changed, wherein the PMC field indicates one of CL mode, OL passive retention mode, OL passive reset mode, and OL active mode, transmit a UE confirmation message to the BS, the UE confirmation message confirming the receipt of the mode change message, receive a BS confirmation message from the BS, the BS confirmation message confirming the receipt of the UE confirmation message.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16e is chiefly described as an example in order to clarify the description, but the technical spirit of the present invention is not limited to IEEE 802.16e.

Figure 1:
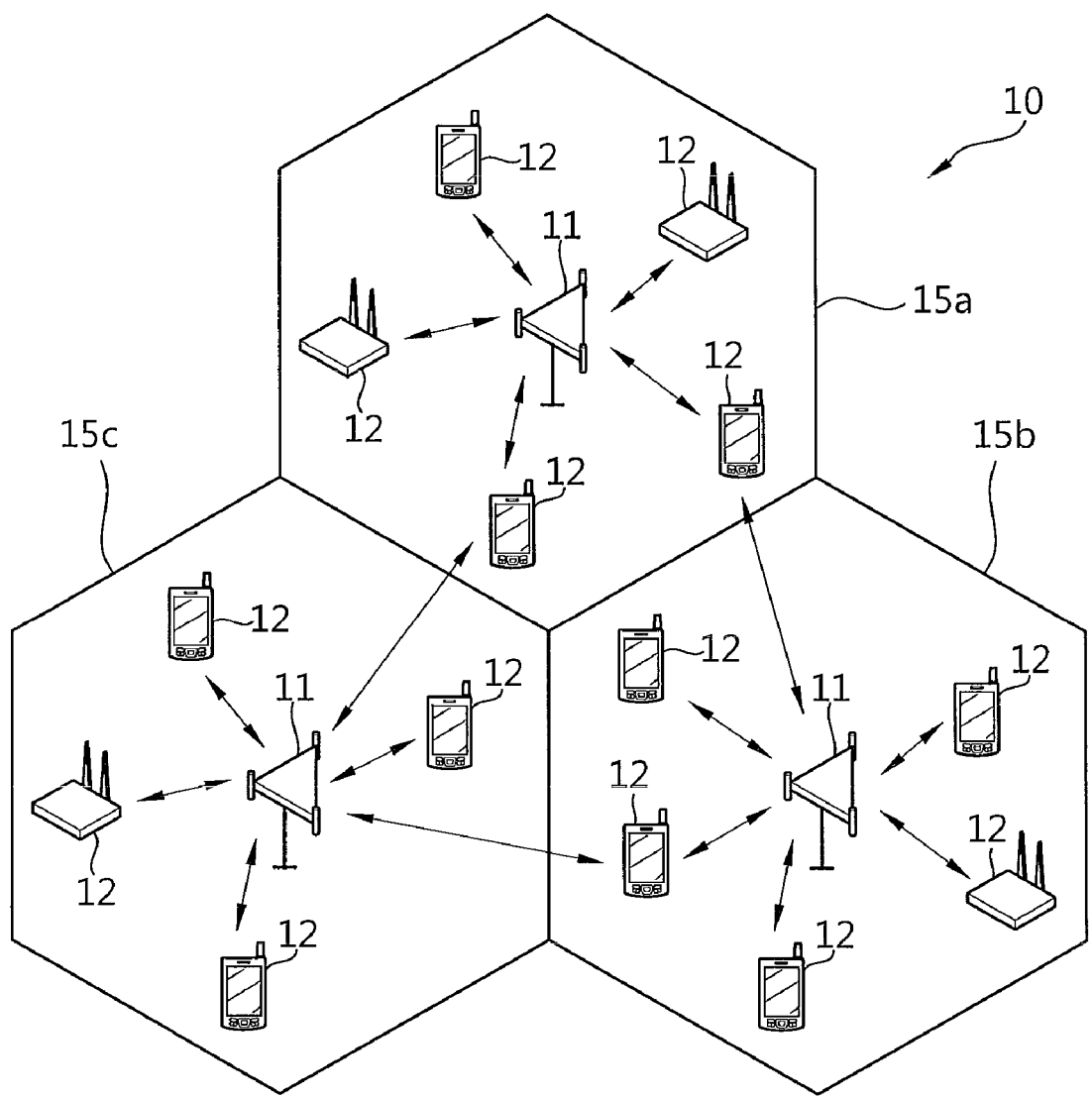
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
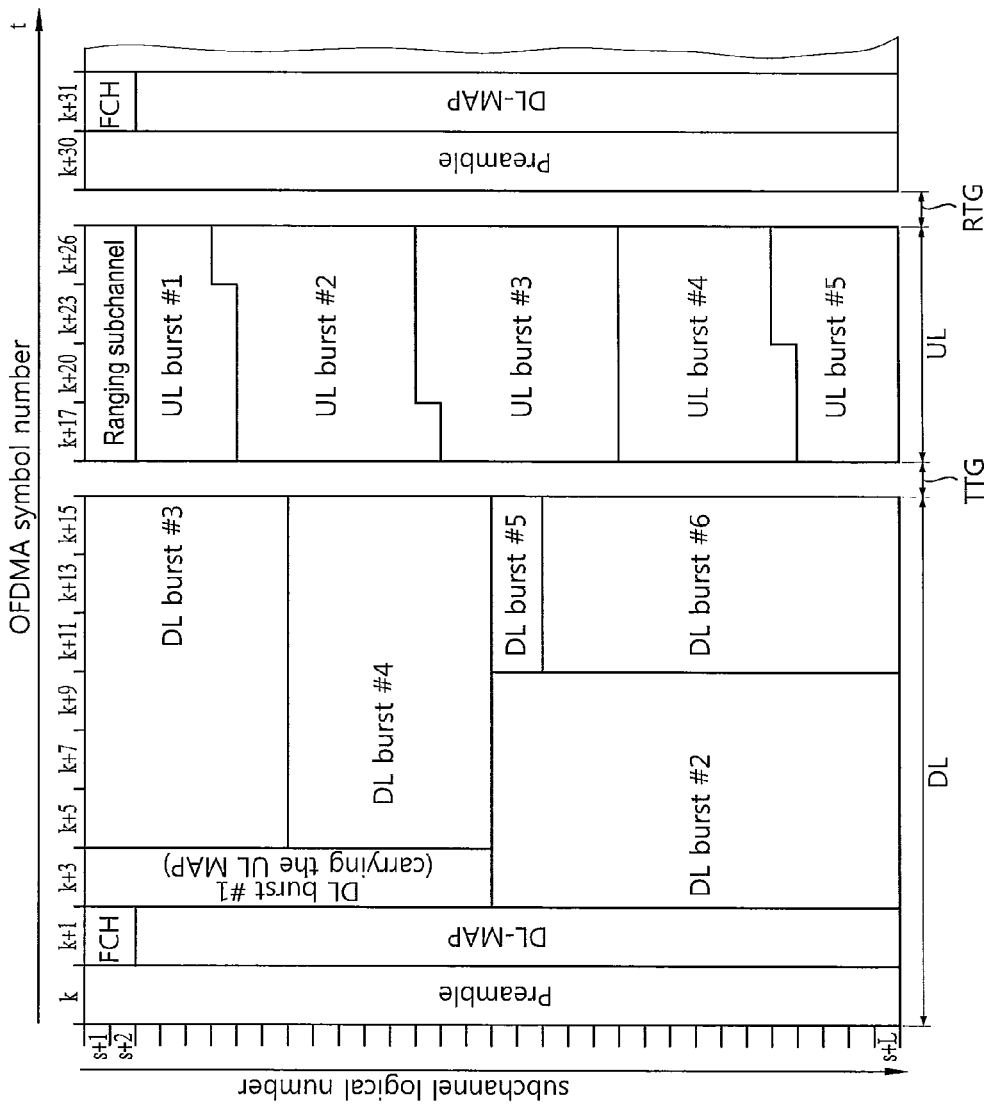
FIG. 2 shows an example of a frame structure.

FIG. 2 shows an example of a frame structure. A frame is a data sequence during a fixed time period used by physical specifications. For detailed information of the data sequence, reference can be made to Paragraph 8.4.4.2 of IEEE standard 802.16-2004 "Part 16: Air Interface for Fixed Broadband Wireless Access Systems".

Referring to FIG. 2, the frame includes a DL subframe and a UL subframe. In the Time Division Duplex (TDD) method, UL transmission and DL transmission share the same frequency, but are performed at different times. The DL subframe starts in order of a preamble, a Frame Control Header (FCH), a DL-MAP, a UL-MAP, and a burst region. A guard time for dividing the DL subframe and the UL subframe is inserted into a middle portion (between the DL subframe and the UL subframe) and the last portion (subsequent to the UL subframe) of the frame. A Transmit/receive Transition Gap (TTG) is placed between DL bursts and subsequent UL bursts. A Receive/transmit Transition Gap (RTG) is placed between UL bursts and a subsequent preamble.

The preamble is used for initial synchronization between a BS and a UE, cell search, a frequency offset, and channel estimation. The FCH includes information about the length of a DL-MAP message and the coding scheme of DL-MAP.

The DL-MAP is a region in which the DL-MAP message is transmitted. The DL-MAP message defines access to a DL channel. It is meant that the DL-MAP message defines an instruction or control information or both for the DL channel. The DL-MAP message includes a configuration change count and a BS Identifier (ID) of a Downlink Channel Descriptor (DCD). The DCD describes a DL burst profile that is applied to the current MAP. The DL burst profile refers to the characteristic of a DL physical channel, and the DCD is periodically transmitted by a BS through a DCD message.

The UL-MAP is a region in which a UL-MAP message is transmitted. The UL-MAP message defines access to a UL channel. It is meant that the UL-MAP message defines an instruction or control information or both for the UL channel. The UL-MAP message includes a configuration change count of an Uplink Channel Descriptor (UCD) and a UL allocation start time defined by the UL-MAP. The UCD describes a UL burst profile. The UL burst profile refers to the characteristic of a UL physical channel, and the UCD is periodically transmitted by a BS through an UCD message.

The DL burst is a region in which data transmitted from a BS to a UE are transmitted, and the UL burst is a region in which data transmitted from a UE to a BS are transmitted.

A fast feedback region is included in the UL burst region of an OFDM frame. The fast feedback region is used to transmit information that requires a fast response from a BS. The fast feedback region can be used for CQI transmission. The position of the fast feedback region is determined by the UL-MAP. The position of the fast feedback region can be fixed or variable within the OFDM frame.

A power control scheme may be chiefly classified into an open-loop power control method and a closed-loop power control method. The closed-loop power control method is a method of controlling power based on a power control message received from a BS. The open-loop power control method is a method of a UE directly determining transmission power based on several factors without receiving direct UP/DOWN commands from a BS. Power per subcarrier according to the open-loop power control method can be calculated using Equation 1. The open-loop power control method is applicable in all UL bursts as shown:

$$P(\text{dBm}) = L + C/N + NI - 10 \times \log_{10}(R) + \text{Offset\_SS}_{perSS} + \text{Offset\_BS}_{perSS} \quad \text{[Equation 1]}$$

where P denotes a transmission power level per subcarrier. L denotes an estimated average UL propagation loss. C/N denotes a normalized C/N of the modulation/Forward Error Correction (FEC) ratio. R denotes the number of repetitions of the modulation/FEC ratio. NI denotes an estimated average power level of noise and interference per subcarrier in a BS. $\text{Offset\_SS}_{perSS}$ denotes correction term for a UE-specific power offset that is controlled by a UE. $\text{Offset\_BS}_{perSS}$ denotes correction term for a UE-specific power offset that is controlled by a BS.

Further, the open-loop power control method can be classified into a passive open-loop power control method and an active open-loop power control method. In the passive open-loop power control method, the $\text{Offset\_SS}_{perSS}$ is determined by a predetermined equation. The $\text{Offset\_SS}_{perSS}$ can be used when changing the power control method from the closed-loop power control method to the open-loop power control method and can be calculated only once while the power control method is changed. Accordingly, the $\text{Offset\_SS}_{perSS}$ remains constant unless the power control method is changed again. In the active open-loop power control method, the $\text{Offset\_SS}_{perSS}$ is controlled within a predetermined range.

Since channel environments of a UE that moves at high speed are rapidly changed, the closed-loop power control method using feedback information transmitted by the BS may result in inaccurate results. Accordingly, there is a need to change the transmission power of the UE by changing the closed-loop power control method into the open-loop power control method, if appropriate. Further, there is a need to change the transmission power of the UE by changing the open-loop power control method into the closed-loop power control method.

A change in the power control method between the closed-loop power control method and the open-loop power control method is determined by the BS. To this end, the BS can send a message, informing a change of a power control method, to the UE, or the UE can transmit a message, requesting a change of a power control method, to the BS. Further, the BS and the UE can exchange confirmation messages indicating that the message has been received. It is hereinafter assumed that in order to change the power control method, a message transmitted from the UE to the BS is a Power control Mode Change Request (PMC_REQ) message and a message transmitted from the BS to the UE is a Power control Mode Change Response (PMC_RSP) message. When the BS determines to change the power control method, the BS transmits the PMC_RSP message to the UE. In response to the PMC_RSP message, the UE transmits the PMC_REQ message to the BS before a frame specified in the PMC_RSP message starts. Further, the UE may request a change of the power control method by sending the PMC_REQ message to the BS. In response to the PMC_REQ message, the BS transmits the PMC_RSP message to the UE.

Table 1 shows an example of the PMC_REQ message.

TABLE 1

| SYNTAX | NOTES |
|---|---|
| PMC_REQ message format { | |
| Management Message Type=63 | Type = 63 |

TABLE 1-continued

| SYNTAX | NOTES |
|---|---|
| Power control mode change | 0b00: Closed-loop power control mode
0b01: Open-loop power control passive mode with $\text{Offset\_SS}_{perSS}$ retention
0b10: Open-loop power control passive mode with $\text{Offset\_SS}_{perSS}$ reset
0b11: Open-loop power control active mode |
| UL transmission power | UL transmission power level for the burst. When the transmission power is different from slot to slot, the maximum value is reported. |
| Confirmation | 0: Request
1: Confirmation |
| } | |

Referring to Table 1, the PMC_REQ message includes a Power control Mode Change (PMC) field. The UE can request a change of the power control method from the BS through the PMC field. The PMC_REQ message further includes a confirmation field. When the value of the confirmation field is 0, the PMC_REQ message functions as a message to request a change of the power control method. When the value of the confirmation field is 1, the PMC_REQ message functions as a response message indicating that the PMC_RSP message transmitted by the BS has been received.

Table 2 shows an example of the PMC_RSP message.

TABLE 2

| SYNTAX | NOTES |
|---|---|
| PMC_RSP message format { | |
| Management Message Type=63 | Type = 64 |
| Power control mode change | 0b00: Closed-loop power control mode
0b01: Open-loop power control passive mode with $\text{Offset\_SS}_{perSS}$ retention
0b10: Open-loop power control passive mode with $\text{Offset\_SS}_{perSS}$ reset
0b11: Open-loop power control active mode |
| Start frame | 6 LSBs of frame number when the indicated power control mode is activated. |
| If (power control mode change==0b00) { | |
| Power adjust | Signed integer, which expresses the change in power level that the MS shall apply to its current transmission power. |
| } else { | |
| $\text{Offset\_BS}_{perMS}$ | Signed integer, which expresses the change in power level that the MS shall apply to the open-loop power control formula. |
| } | |
| } | |

Referring to Table 2, the PMC_RSP message includes a PMC field. The BS can inform the UE of a change of the power control method through the PMC field. When the PMC field indicates the closed-loop power control method, the PMC_RSP message can include a power adjust field. Here, the BS can control the UE so that the UE controls the transmission power level through the power adjust field. When the PMC field indicates the open-loop power control method, the PMC_RSP message can include an $\text{Offset\_BS}_{perMS}$ field. Here, the BS can control the UE so that the UE controls an offset through the $\text{Offset\_BS}_{perMS}$ field.

In the case where the BS informs the UE of a change of the power control method through the PMC_RSP message, the UE may not receive the PMC_RSP message because of poor DL environments. Although the UE has received the PMC_RSP message, the BS may not properly receive the PMC_REQ message, transmitted by the UE in response to the PMC_RSP message, because of poor UL environments. In other words, in the case where there is no confirmation procedure regarding whether the UE has properly changed the power control mode according to the PMC_RSP message transmitted by the BS, if the PMC_RSP message or the PMC_REQ message is not properly transmitted, the performance of the UE may be deteriorated because the power control mode is not changed. Furthermore, in the case where the UE has requested a change of the power control method through the PMC_REQ message, if the UE does not properly receive the PMC_RSP message transmitted by the BS in response to the PMC_REQ message, the UE may continue to request the PMC_REQ message in order to change the power control method. Accordingly, the BS needs to transmit a confirmation message, indicating that it has properly received the PMC_REQ message transmitted by the UE, to the UE.

Hereinafter, some proposed methods of adjusting the power control mode are described.

Figure 3:
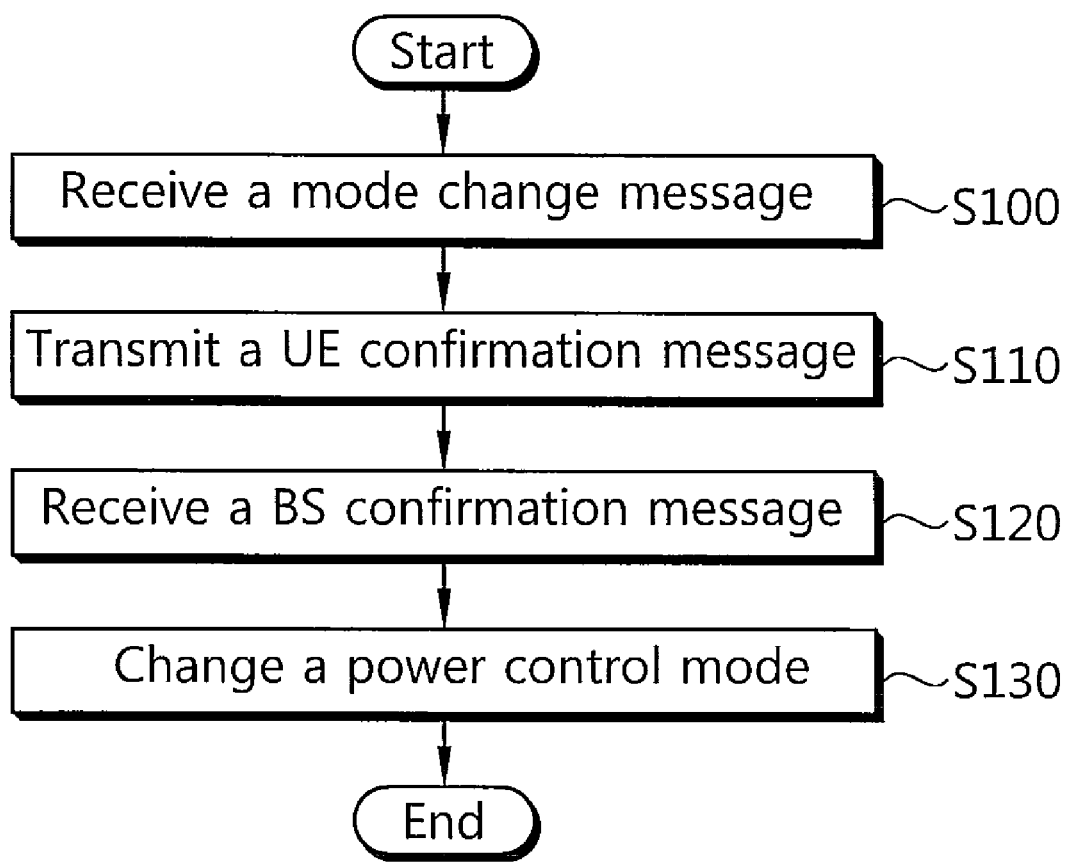
FIG. 3 shows an embodiment of a proposed method of adjusting a power control mode.

FIG. 3 shows an embodiment of a proposed method of adjusting a power control mode.

At step S100, a UE receives a mode change message, informing a change of a power control mode, from a BS. The mode change message may be the PMC_RSP message of Table 2. In an alternative embodiment, the mode change message may be configured by adding a new field to the PMC_RSP message of Table 2.

Table 3 shows another example of the PMC_RSP message.

TABLE 3

| SYNTAX | NOTES |
|---|---|
| PMC_RSP message format { | |
| Management Message Type=63 | Type = 64 |
| Power control mode change | 0b00: Closed-loop power control mode<br>0b01: Open-loop power control passive mode with Offset_SS$_{perSS}$ retention<br>0b10: Open-loop power control passive mode with Offset_SS$_{perSS}$ reset<br>0b11: Open-loop power control active mode |
| Start frame | 6 LSBs of frame number when the indicated power control mode is activated. |
| If (power control mode change==0b00) { | |
| Power adjust | Signed integer, which expresses the change in power level that the MS shall apply to its current transmission power. |
| } else { | |
| Offset_BS$_{perMS}$ | Signed integer, which expresses the change in power level that the MS shall apply to the open-loop power control formula. |
| } | |
| Confirmation | 0: Request<br>1: Confirmation |
| } | |

Referring to Table 3, the PMC_RSP message of Table 3 is configured by adding a confirmation field to the PMC_RSP message of Table 2. The configured PMC_RSP message is used to have the UE confirm that the BS has received the PMC_REQ message transmitted by the UE. At step S100, the value of the confirmation field can be 0 because the mode change message is a message requesting a change of the power control mode.

Meanwhile, in the case where at step S110 to be described later, the BS does not receive a UE confirmation message transmitted by the UE, the BS may repeatedly transmit the mode change message. In this case, the number of times of transmission of the mode change message can be limited to a predetermined number of times.

At step S110, the UE transmits a UE confirmation message, confirming the reception of the mode change message, to the BS. The UE confirmation message may be the PMC_REQ message of Table 1, and the value of the confirmation field of Table 1 can be 1.

At step S120, the UE receives a BS confirmation message, confirming the reception of the UE confirmation message, from the BS. The BS confirmation message can be the PMC_RSP message of Table 3. Here, the BS confirmation message is a message confirming the reception of the UE confirmation message, and so the value of the confirmation field can be 1. Further, the BS may delete the remaining fields other than the confirmation field in the PMC_RSP message of Table 3, configure an independent BS confirmation message including only the confirmation field, and transmit the configured BS confirmation message to the UE.

At step S130, the UE changes the power control mode according to the mode change message. If the power control mode is changed into the closed-loop power control method, the UE can adjust its transmission power level based on the power adjust field of Table 2. If the power control mode is changed into the open-loop power control method, the UE can adjust an offset according to the Offset_BS$_{perMS}$ field of Table 2.

Figure 4:
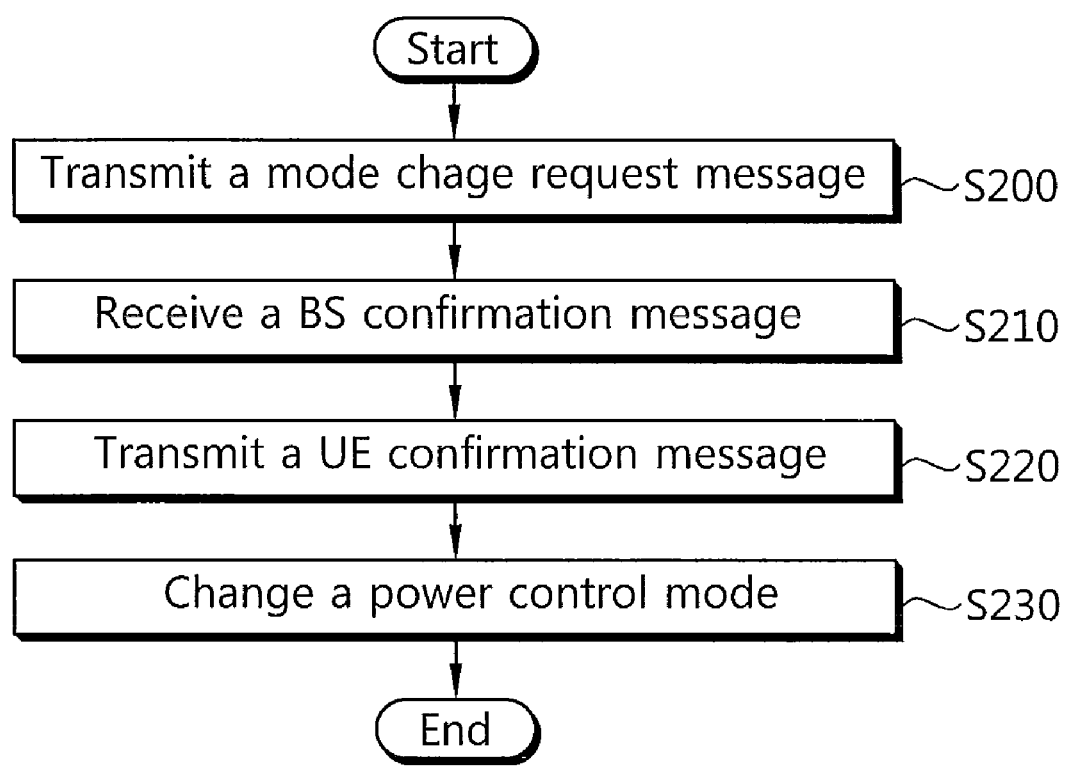
FIG. 4 shows another embodiment of the proposed method of adjusting the power control mode.

FIG. 4 shows another embodiment of the proposed method of adjusting the power control mode.

At step S200, a UE transmits a mode change request message, requesting a change of a power control mode, to a BS. The mode change request message can be the PMC_REQ message of Table 1, and the value of the confirmation field of Table 1 can be 0. Meanwhile, in the case where at step S210 to be described later, the UE does not receive a BS confirmation message transmitted by the BS, the UE may repeatedly transmit the mode change request message. In this case, the number of times of transmission of the mode change request message can be limited to a predetermined number of times.

At step S210, the UE receives a BS confirmation message, confirming the reception of the mode change request message, from the BS. The BS confirmation message can be the PMC_RSP message of Table 3, and the value of the confirmation field of Table 3 can be 1. The BS confirmation message is used to confirm the mode change request message, and the power control mode to be changed is determined in response thereto using a PMC field of the BS confirmation message.

At step S220, the UE transmits a UE confirmation message, confirming the reception of the BS confirmation message, to the BS. The UE confirmation message can be the PMC_REQ message of Table 1, and the value of the confirmation field of Table 1 can be 1.

At step S230, the UE changes the power control mode according to the PMC field of the BS confirmation message.

Figure 5:
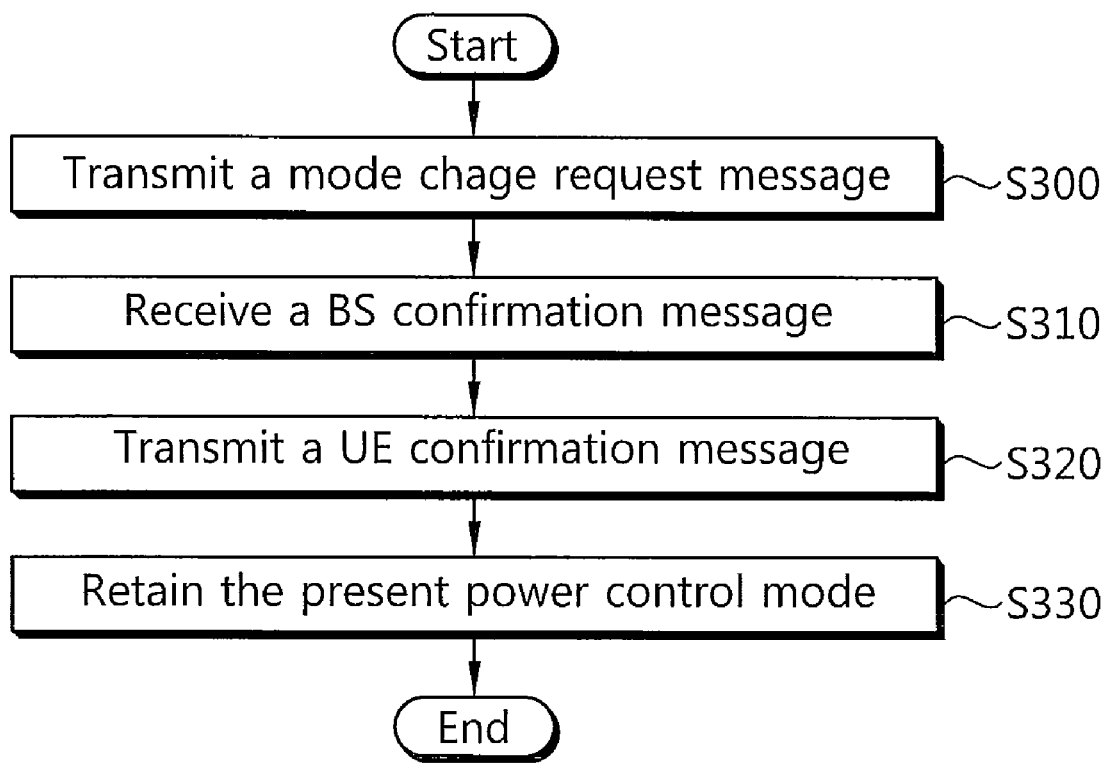
FIG. 5 shows yet another embodiment of the proposed method of adjusting the power control mode.

FIG. 5 shows yet another embodiment of the proposed method of adjusting the power control mode.

At step S300, a UE transmits a mode change request message, requesting a change of a power control mode, to a BS. The mode change request message can be the PMC_REQ message of Table 1, and the value of the confirmation field of Table 1 can be 0.

At step S310, the UE receives a BS confirmation message, confirming the reception of the mode change request message, from the BS. The BS confirmation message can be the PMC_RSP message of Table 3. The PMC_RSP message can be used to ignore the change of the power control mode according to the mode change request message and to determine the retention of a current power control mode in the UE. Here, a field indicating the retention of the current power control mode may be added to the PMC_RSP message.

Table 4 shows yet another example of the PMC_RSP message.

TABLE 4

| SYNTAX | NOTES |
| --- | --- |
| PMC_RSP message format { | |
|     Management Message Type=63 | Type = 64 |
|     Power control mode change | 0b00: Closed-loop power control mode<br>0b01: Open-loop power control passive mode with Offset_SS$_{perSS}$ retention<br>0b10: Open-loop power control passive mode with Offset_SS$_{perSS}$ reset<br>0b11: Open-loop power control active mode |
|     Start frame | 6 LSBs of frame number when the indicated power control mode is activated. |
|     If (power control mode change==0b00) { | |
|         Power adjust | Signed integer, which expresses the change in power level that the MS shall apply to its current transmission power. |
|     } else { | |
|         Offset_BS$_{perMS}$ | Signed integer, which expresses the change in power level that the MS shall apply to the open-loop power control formula. |
|     } | |
| Confirmation | 00: Request<br>01: Confirmation<br>10: Retain |
| } | |

Referring to Table 4, a value indicating the retention of a current power control mode is added to the confirmation field. When the value of the confirmation field is 10, a current power control mode is retained. Accordingly, if the BS wants to retain a current power control mode of the BS despite the power control mode change request from the UE, the BS can set the value of the confirmation field of the PMC_RSP message to 10 at step S310.

At step S320, the UE transmits a UE confirmation message, confirming the reception of the BS confirmation message, to the BS. The UE confirmation message can be the PMC_REQ message of Table 1, and the value of the confirmation field of Table 1 can be 1.

At step S330, the UE retains a current power control mode according to the BS confirmation message.

Figure 6:
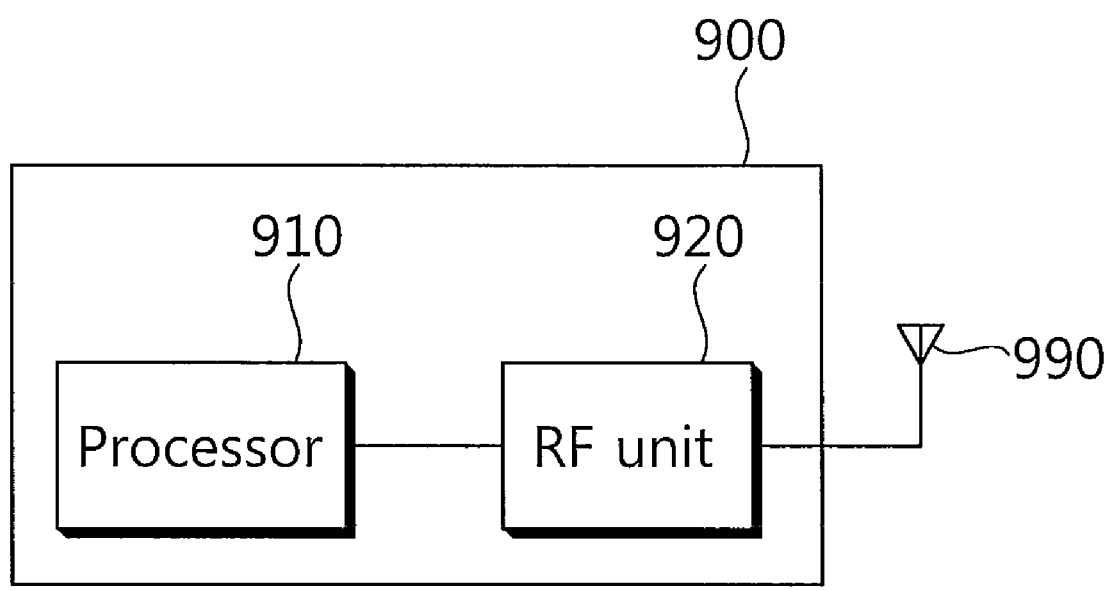
FIG. 6 is a block diagram of a User Equipment (UE) in which the embodiments of the present invention are implemented.

FIG. 6 is a block diagram of a UE in which the embodiments of the present invention are implemented.

The UE 900 includes a processor 910 and an RF unit 920. The processor 910 implements the proposed functions, processes, and/or methods.

The processor 910 receives a mode change message, requesting a change of a power control mode, from a BS and transmits a UE confirmation message, confirming the reception of the mode change message, to the BS. Further, the processor 910 receives a BS confirmation message confirming the reception of the UE confirmation message and changes the power control mode according to the mode change message. The mode change message includes a PMC field indicative of a power control mode to be changed, and the power control mode may be any one of a closed-loop (CL) mode, an open-loop (OL) passive retention mode, an OL passive reset mode, and an OL active mode. The RF unit 920 is connected to the processor 910 and is configured to transmit and receive a radio signal.

The processor 910 may include an Application-Specific Integrated Circuit (ASIC), other chipset, a logic circuit and/or a data processing apparatus. The RF unit 920 may include a baseband circuit for processing a radio signal. In the case where the embodiments are implemented in software, the above-described methods may be implemented using modules (processes, functions, etc.) for performing the above-described functions. The modules may be executed by the processor 910.

Although, in the above illustrative system, the methods have been described on the basis of the flowcharts in the form of a series of the steps or blocks, the present invention is not limited to the sequence of the steps, and some of the steps may be performed at different sequences from the remaining steps or simultaneously with them. Further, those skilled in the art will understand that the steps shown in the flowcharts are not exclusive, the steps may include other steps, or one or more steps of the flowcharts may be deleted without affecting the scope of the present invention.

The performance of a system can be improved and signaling of unnecessary control information can be reduced by certainly adjusting a power control mode through confirmation messages.

While the invention has been shown and described with respect to the some embodiments, it will be understood by those skilled in the art that various changes and modifications may be made without departing from the spirit and scope of the invention as defined in the following claims.

What is claimed is:

1. A method of adjusting power control mode in a wireless communication system, the method comprising:
   receiving a first message comprising a confirmation field and a power control mode change (PMC) field, from a base station (BS), the confirmation field of the first message being set to 0, the PMC field indicating a power control mode to be changed and indicating one of a closed loop (CL) mode, an open loop (OL) passive retention mode, an OL passive reset mode, and an OL active mode;
   transmitting a user equipment (UE) confirmation message to the BS, the UE confirmation message confirming the receipt of the first message; and
   receiving a second message comprising a confirmation field, from the BS, the confirmation field of the second message being set to 1,
   wherein the confirmation field of the first message indicates to request changing the power control mode when the confirmation field of the first message is set to 0, and
   wherein the confirmation field of the second message indicates to confirm the receipt of the UE confirmation message when the confirmation field of the second is set to 1.

2. The method of claim 1, further comprising:
   changing the power control mode based on the first message.

3. The method of claim 1, wherein the first message and the second message have the same message format.

4. The method of claim 1, wherein a size of the confirmation field of one of the first message and the second message is 1 bit.

5. A user equipment (UE) in a wireless communication system, the UE comprising:
   a RF unit for transmitting or receiving a radio signal; and
   a processor operatively coupled to the RF unit and configured to:
   receive a first message comprising a confirmation field and a power control mode change (PMC) field, from a base station (BS), the confirmation field of the first message being set to 0, the PMC field indicating a power control mode to be changed and indicating one of a closed loop (CL) mode, an open loop (OL) passive retention mode, an OL passive reset mode, and an OL active mode;

transmit a UE confirmation message to the BS, the UE confirmation message confirming the receipt of the first message; and receive a second message comprising a confirmation field, from the BS, the confirmation field of the second message being set to 1, wherein the confirmation field of the first message indicates to request changing the power control mode when the confirmation field of the first message is set to 0, and wherein the confirmation field of the second message indicates to confirm the receipt of the UE confirmation message when the confirmation field of the second message is set to 1.

* * * * *